US008068617B2

(12) United States Patent
Katayama et al.

(10) Patent No.: US 8,068,617 B2
(45) Date of Patent: Nov. 29, 2011

(54) AUDIO PLAYBACK SYSTEM

(75) Inventors: Taro Katayama, Kanagawa (JP); Tsuyoshi Haga, Kanagawa (JP)

(73) Assignee: Panasonic Corporation, Osaka (JP)

( * ) Notice: Subject to any disclaimer, the term of this patent is extended or adjusted under 35 U.S.C. 154(b) by 588 days.

(21) Appl. No.: 12/302,870

(22) PCT Filed: May 28, 2007

(86) PCT No.: PCT/JP2007/060825
§ 371 (c)(1), (2), (4) Date: Nov. 28, 2008

(87) PCT Pub. No.: WO2007/139065
PCT Pub. Date: Dec. 6, 2007

(65) Prior Publication Data

US 2009/0190773 A1 Jul. 30, 2009

(30) Foreign Application Priority Data

May 31, 2006 (JP) ................................ 2006-152447

(51) Int. Cl.
*H04B 1/00* (2006.01)
*H04R 5/00* (2006.01)

(52) U.S. Cl. .............. 381/86; 381/17; 381/92; 381/300; 381/302; 381/316; 700/94

(58) Field of Classification Search .................... 381/17, 381/86, 92, 300, 302, 316, 368, 389; 700/94
See application file for complete search history.

(56) References Cited

U.S. PATENT DOCUMENTS

| | | | | |
|---|---|---|---|---|
| 7,477,755 | B2 * | 1/2009 | Saiki et al. | 381/349 |
| 7,760,890 | B2 * | 7/2010 | Furge et al. | 381/86 |
| 2004/0252844 | A1 * | 12/2004 | Christensen et al. | 381/17 |
| 2006/0098827 | A1 * | 5/2006 | Paddock et al. | 381/106 |

FOREIGN PATENT DOCUMENTS

| | | |
|---|---|---|
| JP | 53-135303 | 11/1978 |
| JP | 1-137800 | 5/1989 |
| JP | 4-207499 A | 7/1992 |
| JP | 4-299697 | 10/1992 |
| JP | 4-299697 A | 10/1992 |
| JP | 7-131884 A | 5/1995 |
| JP | 8-331682 | 12/1996 |

OTHER PUBLICATIONS

Japan Office action, mail date is Jul. 5, 2011.
English language Abstract of JP 7-131884 A.

* cited by examiner

*Primary Examiner* — Dao H Nguyen
(74) *Attorney, Agent, or Firm* — Greenblum & Bernstein, P.L.C.

(57) ABSTRACT

Provided is an audio playback system, which reduces a restriction on a place of installation and which reduces the dispersion of characteristics of sound pressures in a low frequency range due to the seats in a passenger interior of a vehicle so that a comfortable bass sound can be enjoyed at any seat. The audio playback system comprises a first filter (108), to which an audio signal outputted from a playback apparatus (107) is inputted, configured to pass a frequency band lower than a first-order resonance frequency of the passenger interior of the vehicle, a first sub-woofer (104) configured to receive an output signal of the first filter (108), a second filter (109), to which the audio signal from the playback device (107) is inputted, configured to pass a frequency band including the first-order resonance frequency of the interior, and a second sub-woofer (105), to which an output signal of the second filter (109) is inputted, configured to be installed near a node of a first-order resonance mode of the interior.

11 Claims, 9 Drawing Sheets

AUDIO PLAYBACK SYSTEM

TECHNICAL FIELD

The present invention relates to an audio playback system that reproduces audio including a low frequency band in a narrow space such as a passenger interior of a vehicle.

BACKGROUND ART

FIG. 8A and FIG. 8B show a configuration of a conventional audio playback system mounted in a vehicle. Further, FIG. 8A is a cross-sectional view showing the vehicle from the side and FIG. 8B is a top view showing the vehicle from above.

In FIG. 8A and FIG. 8B, the conventional audio playback system is equipped in a passenger interior 2 of a sedan vehicle 1 and is provided with a subwoofer 5 in the rear shelf in the passenger interior 2. The Subwoofer 5 is mounted on a trunk 6 as an enclosure, while being directed toward the passenger interior 2.

In case of the sedan vehicle 1, to reproduce bass sound in the passenger interior 2, the subwoofer 5 having about a 20-cm caliber is provided in the rear shelf of the passenger interior and an audio signal of a frequency band of 120 Hz or lower is reproduced therefrom.

If other parts mounted in the vehicle make it difficult to secure sufficient space for installing a subwoofer in the rear shelf, an audio signal having a frequency band of 150 Hz or lower is reproduced by installing a subwoofer of a 16-cm caliber together with an enclosure of, for example, 7 liters to 15 liters, under the driver's seat.

Further, in case of a wagon vehicle, which is popular recently, given that no rear shelf is provided, a subwoofer is generally installed under the driver's seat as described above.

Alternatively, taking into account the resonance modes of the passenger interior, there is a technique of arranging a subwoofer at a location over which the node of the first-order resonance mode and the node of the third-order resonance mode cross.

Furthermore, Patent Document 1 discloses a technique of installing a subwoofer near the joint part of the rear door over which the node of the first-order resonance mode and the node of the third-order resonance mode of the sedan vehicle cross and reproducing the frequency band of the third-order resonance frequency or lower from the subwoofer.

The above resonance mode and resonance frequency will be described.

"Resonance" in the present description refers to a phenomenon of resonance of sound determined by the shape and dimensions of the passenger interior, as in a Helmholtz resonator. A resonance frequency refers to a specific discrete frequency causing the phenomenon of resonance. A resonance mode refers to distribution of sound pressure in case that sound is reproduced in the passenger interior at a resonance frequency, and, in the passenger interior, an area where sound pressure increases significantly is referred to as an "antinode" and an area where sound pressure decreases is referred to as a "node." If a speaker is installed in the antinode of a specific resonance mode and sound is reproduced in the passenger interior at a resonance frequency matching this resonance mode, the phenomenon of resonance occurs and the area where sound pressure is high and the area where sound pressure is low appear remarkably. According to the theory, although there are an infinite number of resonance frequencies and resonance modes in the passenger interior, what is particularly significant upon design of the audio playback system is some modes in a lower frequency band (hereinafter "low band").

The resonance frequencies and resonance modes can be determined according to numerical analysis methods such as the finite element method. For example, in case of a sedan vehicle of 2000 cc displacement, the first-order resonance frequency is about 80 Hz, and the frontmost end and rearmost end of the vehicle provide the antinodes in the first-order resonance mode and the plane which is vertical to the traveling direction near the center of the passenger interior provides the nodes of the first-order resonance mode. Further, the second-order resonance frequency is about 130 Hz, an area above the dashboard in the passenger interior and an area around the footwell of the front seats provide the antinodes in the second-order resonance mode, and the plane which is virtually parallel to the ground at the height near the shoulders of the passengers, provides the nodes of the second-order resonance mode. In addition to the above numerical analysis method, nodes and antinodes can be measured and determined by installing a speaker and a microphone in an actual vehicle.

FIG. 9A to C show the nodes and antinodes in the first- to third-order resonance modes of the vehicle. Further, FIG. 9A is a perspective view of the vehicle, FIG. 9B is a cross-sectional view showing the vehicle from the side and FIG. 9C is a plan view showing the vehicle from above.

As shown with dotted lines in FIG. 9A to FIG. 9C, nodes a to c in the first- to third-order resonance modes appear and antinodes d and e of the resonance modes shown by hatching in FIG. 9B and FIG. 9C appear in the passenger interior.

Patent Document 1: Japanese Patent Application Laid-Open No. HEI7-131884

DISCLOSURE OF INVENTION

Problems to be Solved by the Invention

However, with such a conventional audio playback system mounted in a vehicle, there is a problem that the low band of the reproduced sound from a subwoofer installed in the rear shelf is too big in the back seats and too small in the front seats. This is because in case of a sedan vehicle, the first-order resonance frequency of the passenger interior is about 80 Hz, and the antinodes of the resonance mode appear near the rear shelf and the head rests of the back seats and the nodes appear near the head rests of the front seats. Bass sounds from the subwoofer are amplified near the heads of the passengers in the back seats, and sounds near 80 Hz is too big for the passengers in the back seats.

FIG. 10 and FIG. 11 show sound pressure-frequency characteristics in case there is a subwoofer only in the rear shelf. In these figures, the dash lines represent the first-order resonance frequency f1 (=80 Hz) in the frequency domain.

As shown in FIG. 10, if the sound pressure-frequency characteristics are adjusted to be substantially flat in the front seats (see line La), sounds with frequencies around 80 Hz becomes too big in the back seats (see curve Ca). By contrast with this, as shown in FIG. 11, if the sound pressure-frequency characteristics are adjusted to be substantially flat in the back seats (see line Lb), the sound pressure near the first-order resonance frequency becomes small in the front seats (see curve Cb).

In an actual vehicle, the sound pressure of the first-order resonance frequency at the antinodes sometimes differs from that of the first-order resonance frequency at the nodes, the difference being 10 dB or greater. In this case, if the equalizer of a playback device is adjusted such that the frequencies around 80 Hz can be heard comfortably in the front seats, the low band becomes too big in the back seats and causes annoyance. By contrast with this, if the frequencies are adjusted to be heard comfortably in the back seats, the bass sounds are felt insufficiently in the front seats.

Further, for example, in case of a minivan vehicle with three rows of seats, the first-order resonance frequency of the passenger interior is about 40 Hz, and the node of the first-order resonance mode appears in the seat location of the second row and the antinode appears in the seat location of the third row. Further, the second-order resonance frequency is about 80 Hz, and the nodes appear between the seats of the first row and the second row and between the seats of the second row and the third row and the antinode appears in the seat location of the second row.

Further, there are the following problems in the technique of above Patent Document 1.

The first problem is that subwoofers of a big caliber cannot be installed around the joint parts of the doors near the back seats. Particularly, a subwoofer of, for example, a 25-cm caliber is required to output bass sounds with the low band near 20 Hz, which is the limit of the audible band for people. However, if the node of the resonance mode, which is an optimal location for arranging a subwoofer and each of the joint parts of a doors overlap, a subwoofer of a big caliber cannot be installed. In this way, there is a problem that the location for installing the subwoofer is restricted in the conventional configuration.

Further, the second problem is that, in case of a wagon vehicle, which is popular recently, given that the locations of the nodes of the first-order resonance mode match with or are close to the locations of the antinodes of the second-order resonance mode, if a subwoofer is installed in the node of the first-order resonance mode, the sound of the resonance frequency of the second-order resonance mode is amplified and sound quality of the reproduced sound deteriorates. That is, there is a problem that comfortable bass sound can be enjoyed only in specific seats.

In view of the above points, it is therefore an object of the present invention to provide an audio playback system that makes it possible to reduce the restriction imposed on installation locations, reduce fluctuation of sound pressure-frequency characteristics of the low band between the seats in the passenger interior, and enjoy comfortable bass sound in all seats.

Means for Solving the Problem

The audio playback system according to the present invention includes: a first filter, to which an audio signal outputted from a playback apparatus is inputted, configured to pass a frequency band lower than a first-order resonance frequency of an interior of a vehicle; a first subwoofer configured to receive an output signal of the first filter; a second filter, to which the audio signal from the playback apparatus is inputted, configured to pass a band including the first-order resonance frequency of the interior; and a second subwoofer, to which an output signal of the second filter is inputted, configured to be installed near a node of a first-order resonance mode of the interior.

Advantageous Effect of the Invention

With the size of a typical vehicle, the first-order resonance frequency in the interior is higher than the lower limit (about 20 Hz) of the audible band for people. Further, generally, if the reproduced frequency band is higher, the caliber of a speaker can be made smaller. In this way, the caliber of the second subwoofer can be made smaller than a conventional subwoofer. Consequently, it is possible to reduce the restriction imposed upon locations for installing the second subwoofer. Further, the present invention has the second subwoofer installed near the node of the first-order resonance mode of the interior. Consequently, it is possible to reduce fluctuation of sound pressure-frequency characteristics of the low frequency band between the seats in the passenger interior and enjoy comfortable bass sounds in all seats.

BEST MODE FOR CARRYING OUT THE INVENTION

Embodiments of the present invention will be described in detail below with reference to the drawings.

Embodiment 1

Figure 1A:
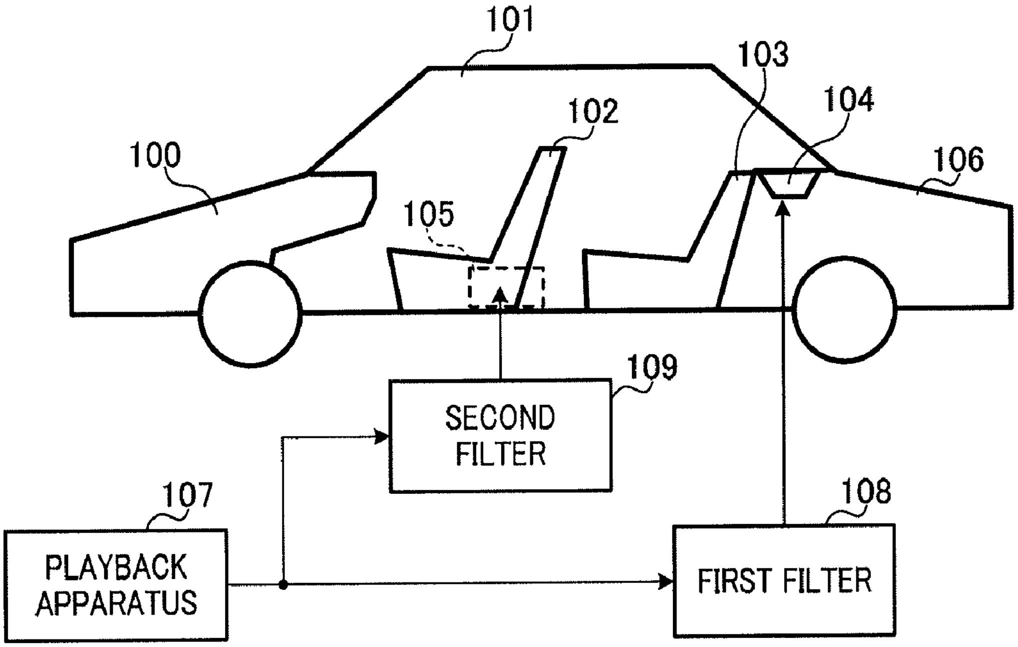
FIG. 1A shows a configuration of an audio playback system and a vehicle from the side, according to Embodiment 1 of the present invention.
Figure 1B:
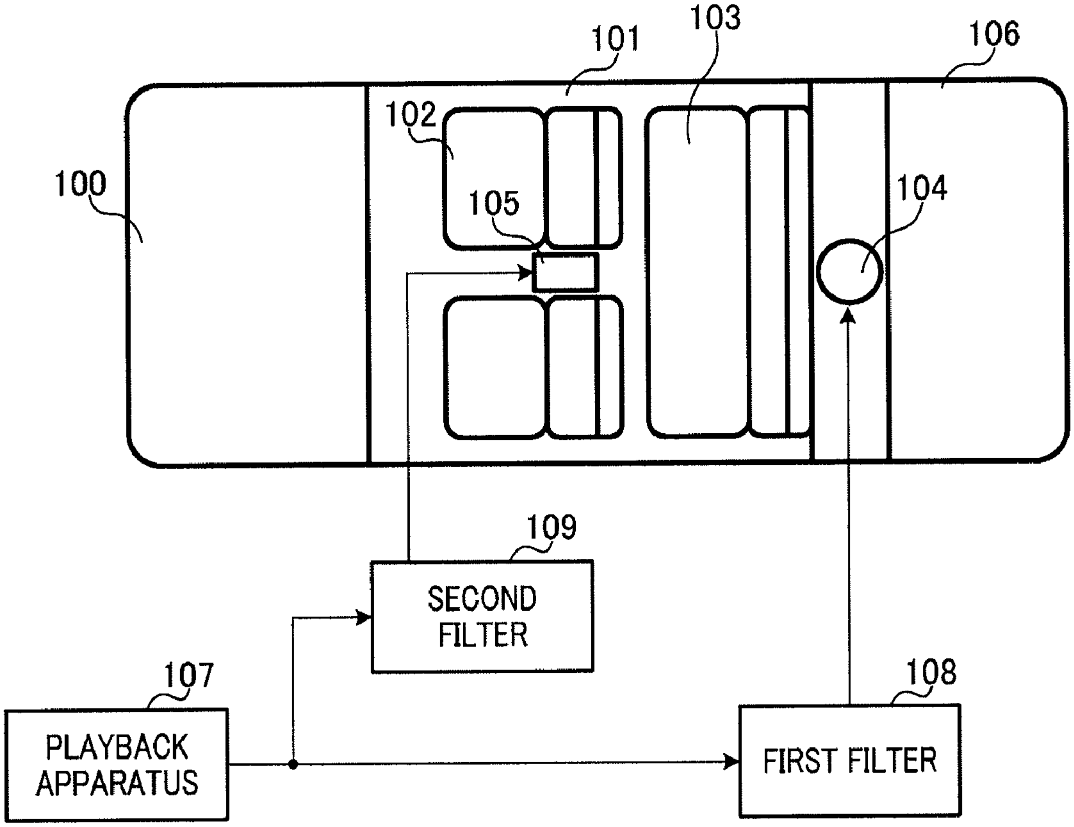
FIG. 1B shows a configuration of the audio playback system and a vehicle from above, according to Embodiment 1 of the present invention.

FIG. 1 shows a configuration of the audio playback system according to Embodiment 1 of the present invention, FIG. 1A is a cross-sectional view showing the vehicle from the side and FIG. 1B is a plan view showing the vehicle shown in FIG. 1A from above. An example will be described where the present embodiment is applied to the audio playback system mounted in sedan vehicle (hereinafter simply "vehicle" with the present embodiment) shown in FIG. 1A and FIG. 1B.

In FIG. 1A and FIG. 1B, the audio playback system has a first subwoofer 104 installed in the rear shelf of a vehicle 100 and a second subwoofer 105 installed around a node of the first-order resonance mode of a passenger interior 101 of the vehicle 100. The first subwoofer 104 is mounted so that the subwoofer 104 is directed toward the passenger interior 101 and utilizes a trunk 106 of the vehicle 100 as an enclosure. The first subwoofer 104 has a caliber of 20 cm or more, utilizes the trunk 106 as an enclosure and has sufficient capability of reproduction up to approximately 20 Hz, which is the lower limit of the audible band for people.

The first subwoofer 104 and the second subwoofer 105 reproduce low band audio signals from a playback apparatus 107 connected with the audio playback system and output the signals as sounds.

The playback apparatus 107 is exemplified by a CD player, DVD player, MD player, cassette player, radio, television receiver and playback section of an information terminal, that outputs audio signals representing sounds to be reproduced in the passenger interior. The audio signals outputted from the playback apparatus 107 are inputted to a first filter 108 and a second filter 109.

Figure 3:
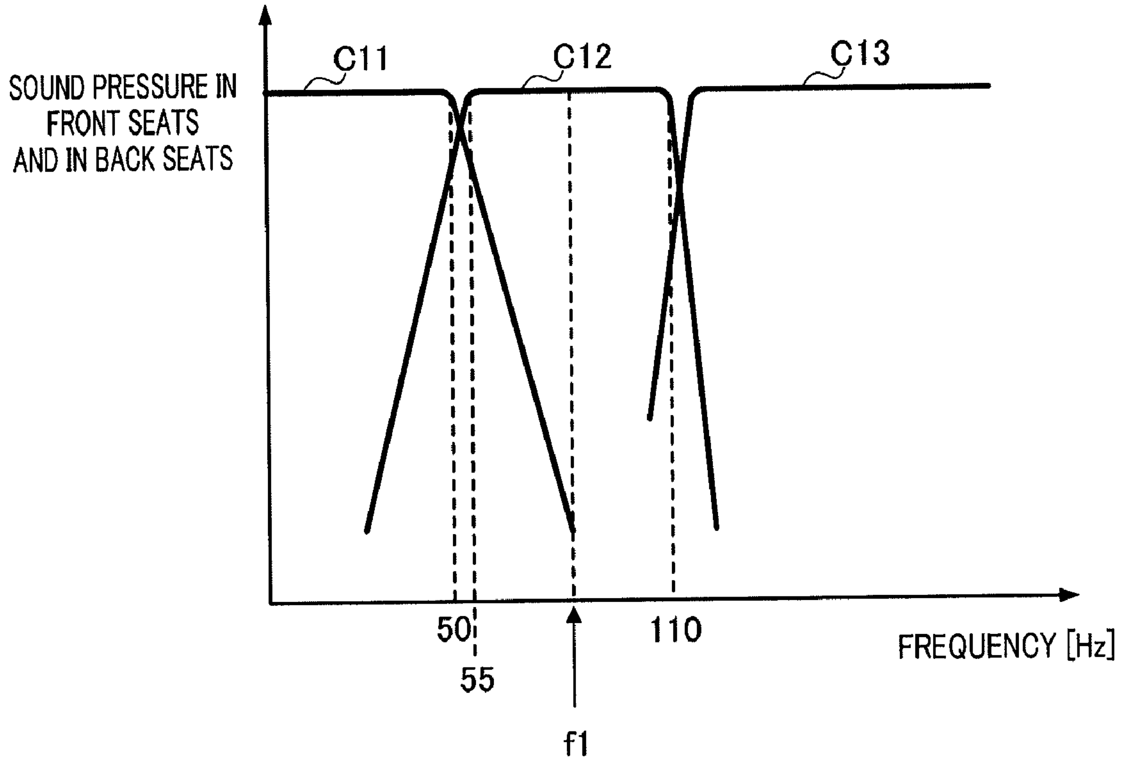
FIG. 3 shows sound pressure-frequency characteristics in the front seats and in the back seats of the audio playback system according to the above embodiment.

The first filter 108 is a low pass filter (LPF) and, as shown by the cutoff characteristic curve C11 of FIG. 3, the cutoff frequency of the first filter 108 is set equal or lower than the first-order resonance frequency f1 of the passenger interior 101. The first-order resonance frequency varies depending on the shape of the vehicle 100 and nevertheless is about 70 to 85 Hz in case of the sedan. In light of above description, the first filter 108 exemplarily has cutoff characteristics that the cutoff frequency thereof is 60 Hz and has 12 db attenuation per octave if a frequency is higher than the cutoff frequency. The first filter 108 may have other cutoff characteristics that the cutoff frequency thereof is 40 Hz and has 18 db attenuation per octave if a frequency is higher than the cutoff frequency. Note that the above cutoff characteristics are examples, and the cutoff frequency and attenuation characteristics of the frequency range higher than the cutoff frequency may be combined at random, as long as the combination is set by listening and physical acoustic measurement so that sound quality is optimal.

The first-order resonance mode excited at the first-order resonance frequency will be described.

Figure 2:
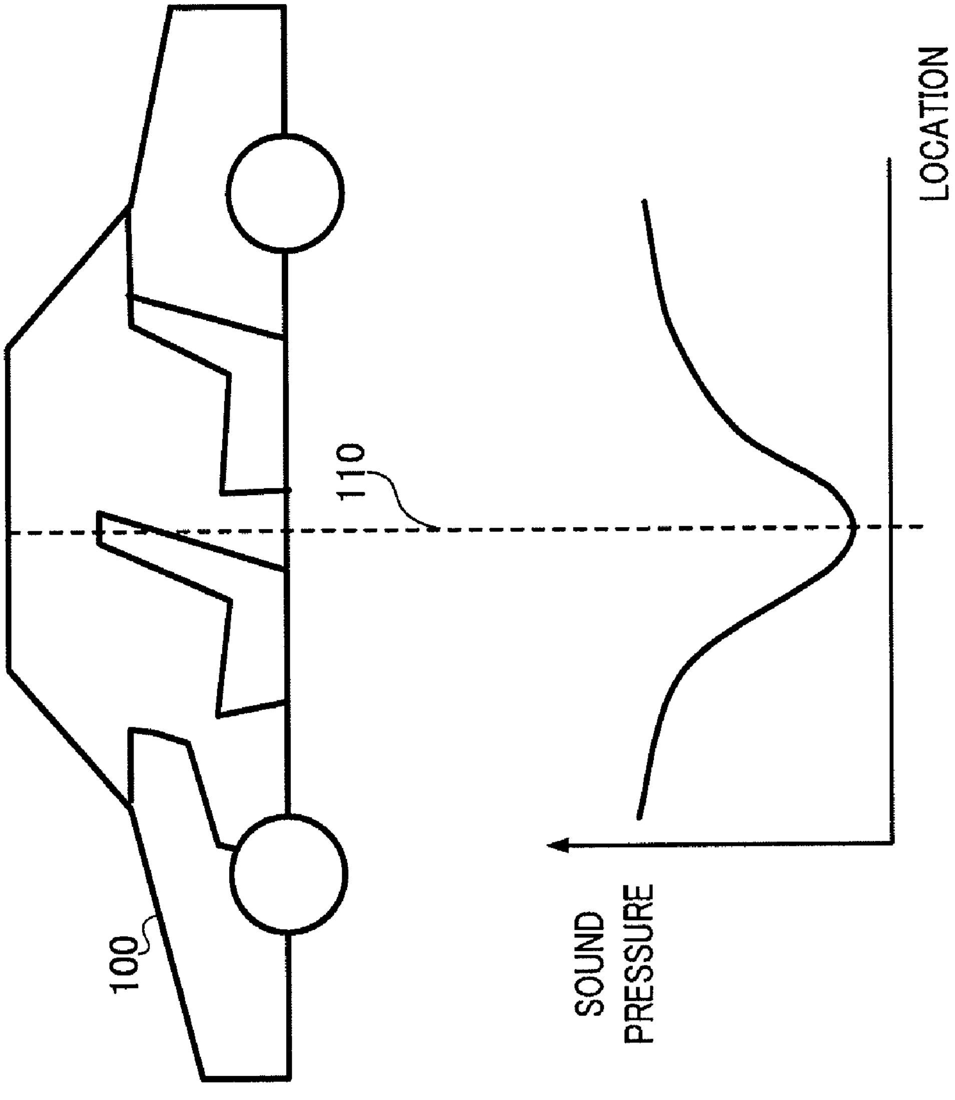
FIG. 2 shows distribution of sound pressure in a resonance mode in the passenger interior of a sedan vehicle with the audio playback system according to the above embodiment.

FIG. 2 shows distribution of sound pressure in the resonance mode of the passenger interior 101 of the sedan vehicle 100 shown in FIG. 1.

As shown in FIG. 2, the plane which is virtually vertical to the traveling direction of the vehicle 100 near the heads of the passengers in the front seats of the vehicle 100 provides a node 110 of the first-order resonance mode, and the plane which is vertical to the traveling direction near the rear shelf or near the footwell in the front seats provides the antinode of the first-order resonance mode. The locations of the node and the antinode depend on the shape of the passenger interior, and resonance occurs by mounting a speaker in the location of the antinode and reproducing a signal of the first-order resonance frequency matching the first-order resonance mode. That is, if an audio signals including the first-order resonance frequency is inputted to a speaker installed in the location of the antinode of the first-order resonance mode, resonance of the frequency components of the first-order resonance frequency occurs, the sound pressure of the frequency components is increased in the location of the antinode of the first-order resonance mode and is not increased in the location of the node, and, therefore, extreme fluctuation of a specific frequency occurs in distribution of sound pressure in the passenger interior 101. In case of the sedan vehicle 100, sounds with first-order resonance frequency of 80 Hz outputted by the subwoofer installed in the rear shelf results in very large sound volume in the back seats even though the sound volume is not large in the front seats, and therefore not all passengers can enjoy comfortable audio.

The feature of the present embodiment is that the first subwoofer 104 installed in the rear shelf reproduces only the low frequency band not including the first-order resonance frequency which excites this first-order resonance mode. By this means, it is possible to solve the problem that sounds with frequencies around 80 Hz, which is the first-order resonance frequency, is not too small in the front seats and too big in the back seats.

Referring back to FIG. 1A and FIG. 1B, the second subwoofer 105 is installed around the node 110 (see the dotted lines in FIG. 2) of the first-order resonance mode. For example, as shown in FIG. 1B, the second subwoofer 105 is installed in the floor of the passenger interior, for example, under the driver's seat or between the driver's seat and the front passenger seat.

As shown by the pass characteristic curve C12 of FIG. 3, the second filter 109 is a filter including the first-order resonance frequency f1 in its passband, passes signal components included in the passband from an output signals from the playback apparatus 107 and outputs the resulting signals to the second subwoofer 105. Next, the second filter 109 will be described in detail. The second filter 109 is a bandpass filter (BPF) with characteristics that the first-order resonance frequency f1 is included in the passband. Cutoff characteristics of the lower side may be set in combination with the characteristics of the sounds outputted from the first subwoofer 104 through the first filter 108, so that sound quality is optimal. One example of the cutoff characteristics has 55 Hz as the cutoff frequency and 6 dB attenuation per octave in the frequency range which is lower than the cutoff frequency. Such second filter 109 is utilized with the first filter 108 having cutoff frequency 50 Hz to 40 Hz. Further, the cutoff characteristics of the higher side of the second filter 109 has 110 Hz as the cutoff frequency and 12 dB attenuation in the frequency range which is higher than the cutoff frequency. The cutoff characteristics of the higher side may be determined in combination with acoustic characteristics of door speakers mounted in the doors of the vehicle 100 or other speakers. These door speakers only need to reproduce the sound with the frequency band higher than the sound outputted from the second subwoofer 105.

Further, the second filter 109 may be an octave bandpass filter in which the center of the passband is the first-order resonance frequency.

Locations of the nodes in the first-order resonance mode can be determined by one of theoretical calculation, computer simulation, actual measurement and listening or combination of two or more of these, and are likely to shift backward and forward depending on the types of vehicles. Further, the location of the second subwoofer 105 and the center frequency of the passband of the second filter 109 may be determined, for example, as follows. That is, the first subwoofer 104 is mounted in the rear shelf and distribution of sound pressure in the passenger interior 101 in the frequency band of about 120 Hz or lower is actually measured. The frequency producing the most significant fluctuation in distribution of sound pressure is the center frequency of the passband of the second filter 109 and the location of the node in this frequency is the location of the second subwoofer 105.

Figure 4:
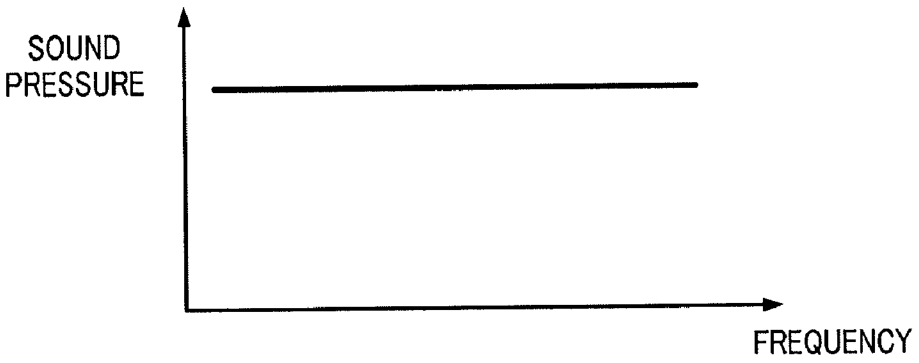
FIG. 4 illustrates an effect produced by sound pressure-frequency characteristic of the audio playback system in the front seats and in the back seats according to the above embodiment.

FIG. 3 shows sound pressure-frequency characteristics in the front seats and the back seats. Further, FIG. 3 shows the cutoff characteristic curve C11 of the first filter 108, the pass characteristic curve C12 of the second filter 109 and the curve C13 showing characteristics of the frequency band outputted by the door speaker (not shown). FIG. 4 illustrates an technical effect produced by sound pressure-frequency characteristics in the front seats and in the back seats.

As shown in FIG. 3, the first subwoofer 104 installed in the rear shelf outputs only the low band not including the first-order resonance frequency (about 70 to 85 Hz with the sedan vehicle 100) that excites the first-order resonance mode by means of the first filter 108, so that it is possible to solve the problem that sound with frequencies around 80 Hz, which is around the first-order resonance frequency, is too small in the front seats and too big in the back seats. Next, the second subwoofer 105 installed around the node of the first-order resonance mode reproduces sounds with the passband in which the first-order resonance frequency is placed in the center by means of the second filter 109 and thereby outputting sound with the middle and low band that cannot be covered by the first subwoofer 104. Further, the door speaker reproduces the signal components included in the frequency band (see curve C13 of FIG. 3) higher than the sound outputted by the second subwoofer 105. By this means, as shown in FIG. 4, the sound pressure-frequency characteristics in the passenger interior become substantially flat regardless of listening points in the front seats or in the back seats, so that it is possible to reduce fluctuation in sound pressure-frequency characteristics between the seats in the passenger interior.

In this way, the second subwoofer 105 arranged around the location of the node of the resonance mode, which the interior of the vehicle naturally has, reproduces only signals subjected to band limitation such that the resonance frequency matching the resonance mode is included in the signals by means of the second filter 109, so that it is possible to output bass sounds evenly in all seats in the passenger interior.

As described above, according to the audio playback system, the second filter 109 extracts the frequency band which is higher than the cutoff frequency of the first filter 108 and which places the first-order resonance frequency as the center frequency, from the audio signals from the playback apparatus 107 and gives the extracted frequency band to the second subwoofer 105. With the size of a typical vehicle, the first-order resonance frequency in the passenger interior is higher than the lower limit (about 20 Hz) of the audible band for people. Further, generally, in case that the reproduced frequency band is higher, the caliber of the speaker can be made smaller. Accordingly, it is possible to make the caliber of the second subwoofer smaller than the conventional subwoofer. Consequently, it is possible to reduce the restriction imposed upon locations for installing the second subwoofer.

Further, the audio playback system of the sedan vehicle 100 has: the first filter 108 that passes a frequency band lower than the first-order resonance frequency of the passenger interior 101; the first subwoofer 104 that receives an output signal from the first filter 108; the second filter 109 that passes a frequency band including the first-order resonance frequency of the passenger interior; and the second subwoofer 105 that receives an output signal from the second filter 109 and that is installed near the node of the first-order resonance mode of the passenger interior 101, and the first subwoofer 104 outputs sound components that pass a band of the first-order resonance frequency or lower in the first filter 108, and the second subwoofer 105 outputs sound components placing the first-order resonance frequency of about 80 Hz in the center of the passband, in the second filter 109, so that it is possible to reduce fluctuation in the sound pressure-frequency characteristics of the low band between the seats in the passenger interior and enjoy comfortable low sound in all seats.

Embodiment 2

Figure 5A:
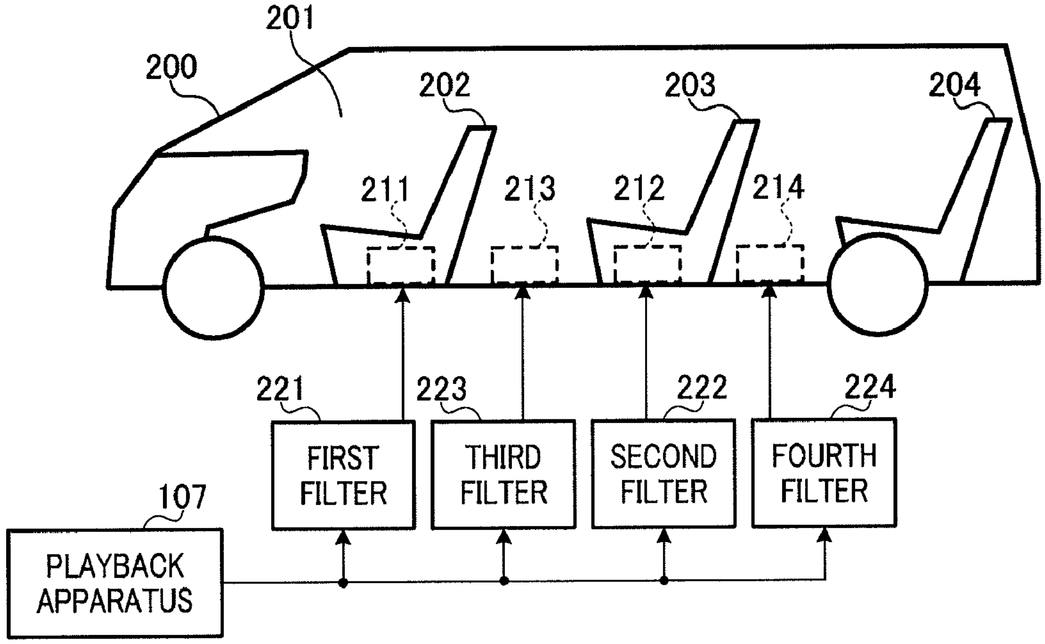
FIG. 5A shows a configuration of the audio playback system and a vehicle from the side, according to Embodiment 2 of the present invention.
Figure 5B:
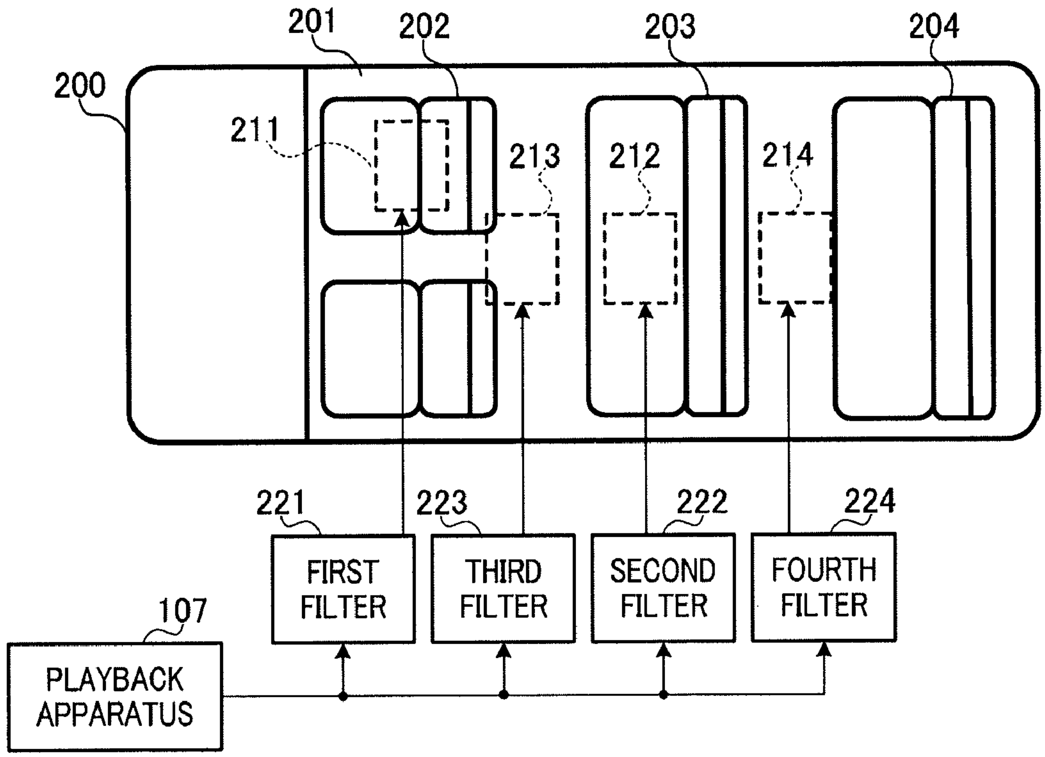
FIG. 5B shows a configuration of the audio playback system and a vehicle from above, according to Embodiment 2 of the present invention.

FIG. 5 shows a configuration of the audio playback system according to Embodiment 2 of the present invention, FIG. 5A is a cross-sectional view showing the vehicle from the side and FIG. 5B is a plan view showing the vehicle from above. The same components as in FIG. 1 will be assigned the same reference numerals and repetition of description will be omitted. An example will be described where the present embodiment is applied to the audio playback system mounted in a wagon vehicle 200 (see FIG. 5A and FIG. 5B) which is popular recently.

In FIG. 5A and FIG. 5B, the audio playback system has a first subwoofer 211, a second subwoofer 212, a third subwoofer 213, a fourth subwoofer 214, a first filter 221, a second filter 222, a third filter 223 and a fourth filter 224 that are installed in a passenger interior 201.

The audio signals outputted from the playback apparatus 107 are outputted to the first filter 221, the second filter 222, the third filter 223 and the fourth filter 224.

The passenger interior 201 of the wagon vehicle 200 is longer in the traveling direction than the sedan vehicle 100 of Embodiment 1. Taking into account the feature of the wagon vehicle 200, parts different from Embodiment 1 will be described.

Figure 6:
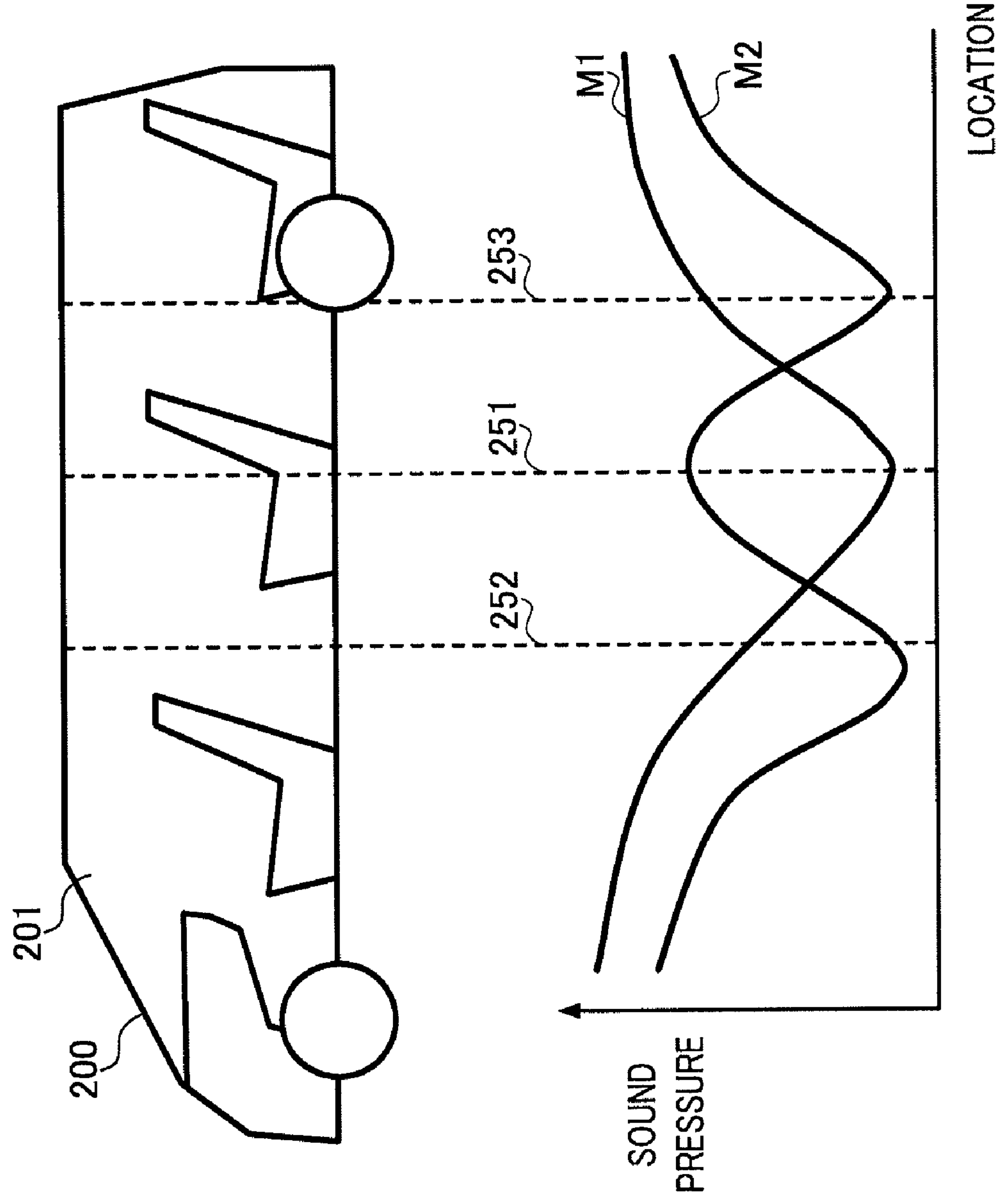
FIG. 6 shows distribution of sound pressure in the resonance mode in the passenger interior of the wagon vehicle of the audio playback system according to the above embodiment.

FIG. 6 shows distribution of sound pressure in the resonance mode of the passenger interior of the wagon vehicle 200.

As shown in FIG. 6, there are a first-order resonance mode M1 and a second-order resonance mode M2 in the passenger interior 201 of the wagon vehicle 200. In the first-order resonance mode M1, the antinodes appear around the front end part of the passenger interior 201 and around the positions of the heads in the third row seats, and a node 251 appears around the seat location of the second row. The first-order resonance frequency f1 which excites the first-order resonance mode M1 is about 40 to 50 Hz in most cases. Further, in the second-order resonance mode M2, to the contrary, the location of the node 251 of the first-order resonance mode M1 becomes the antinode and nodes 252 and 253 appear around both forward and backward sides of the antinode.

Conventionally, although a subwoofer is mounted under the driver's seat in most cases, this causes unbalance, that is, the sound volume of low frequency band from 40 Hz to 50 Hz included in movie content of DVD is insufficient in the second row and is excessive in the third row. Further, the second-order resonance frequency f2 which excites the second-order resonance mode M2 is about 80 Hz to 90 Hz, if, for example, a low band of 120 Hz or lower is reproduced by installing a subwoofer around the node 251 of the first-order resonance mode M1, the second-order resonance mode M2 is excited and there is a problem that sound pressure around 80 Hz is too high in the second row and too low in the first row.

Figure 7:
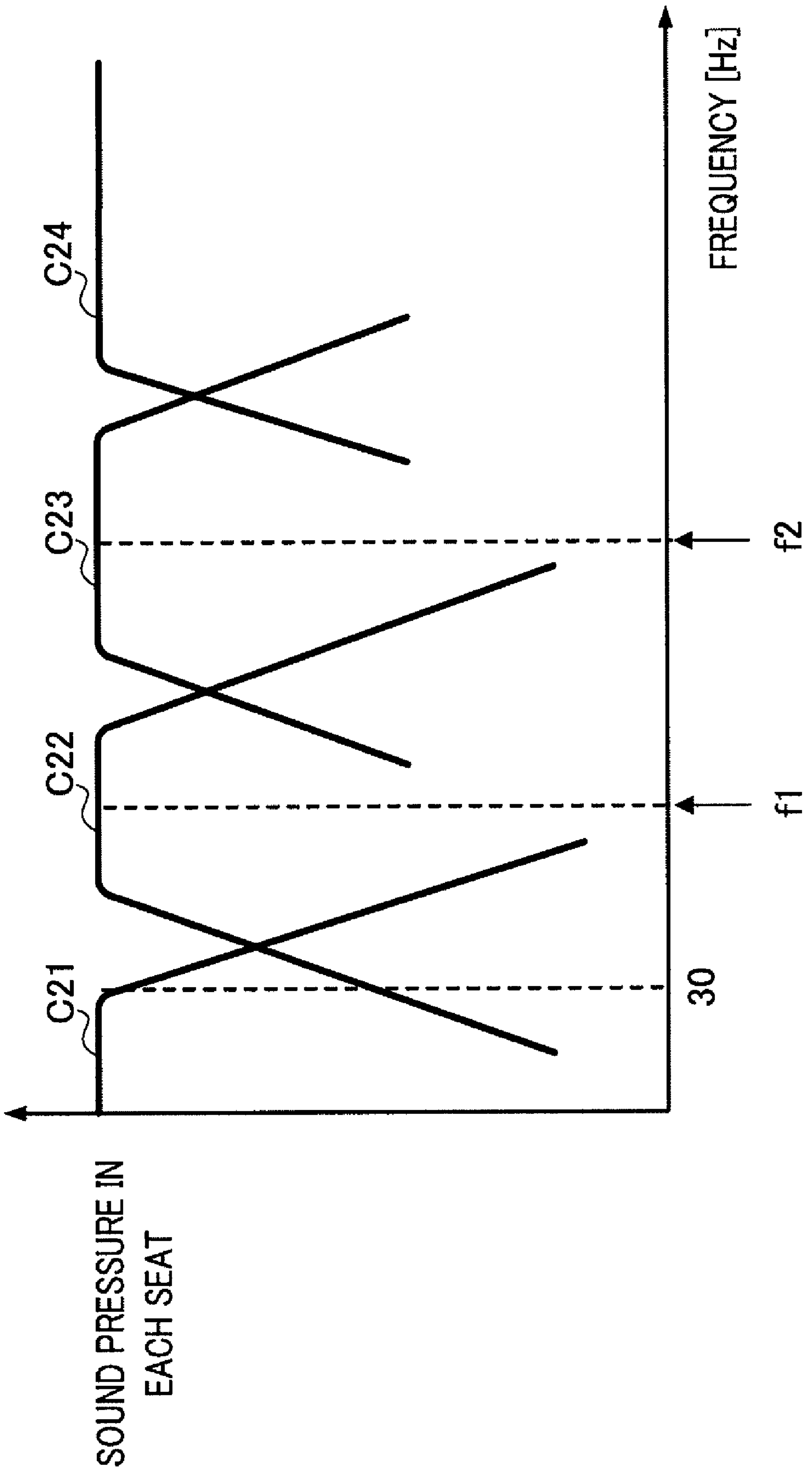
FIG. 7 shows sound pressure-frequency characteristics of the audio playback system in the front seats and in the back seats according to the above embodiment.
Figure 8A:
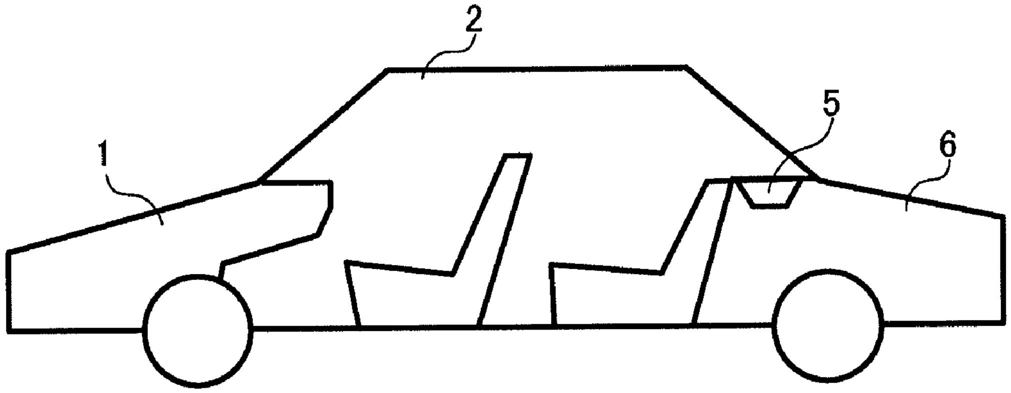
FIG. 8A shows a configuration of a conventional audio playback system mounted in a vehicle and a vehicle from the side.
Figure 8B:
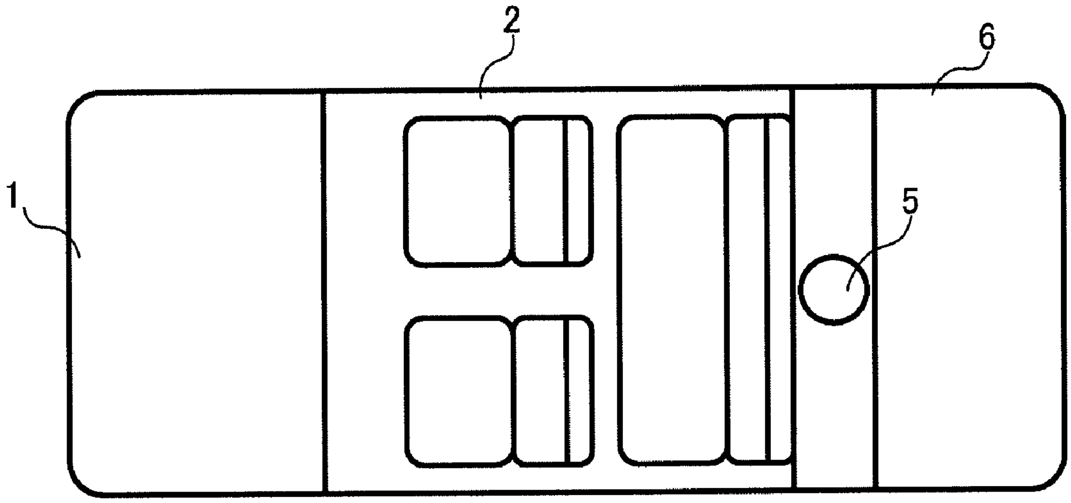
FIG. 8B shows a configuration of a conventional audio playback system mounted in a vehicle and a vehicle from above.
Figure 9A:
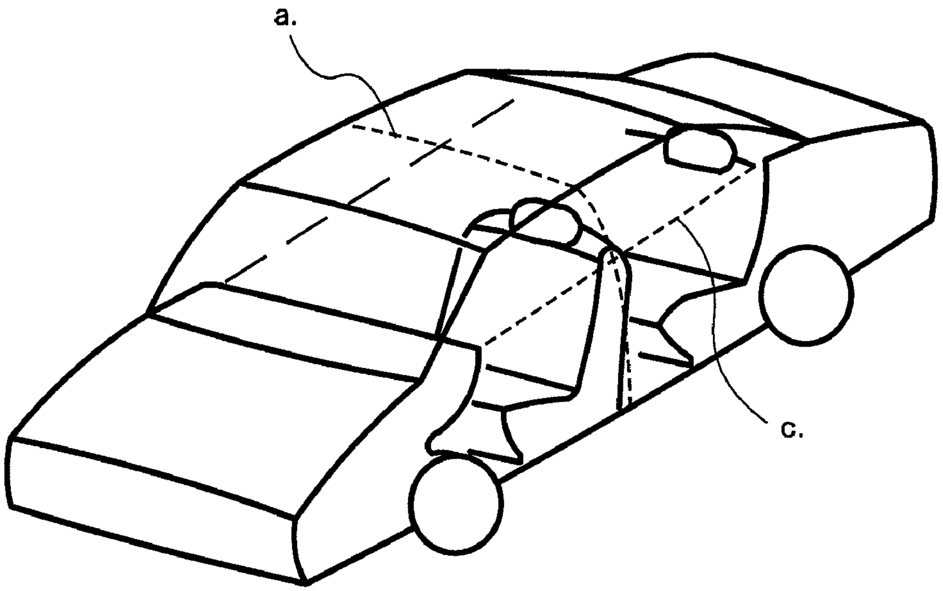
FIG. 9A shows nodes a and c of the first- to the third-order resonance modes of the passenger interior.
Figure 9B:
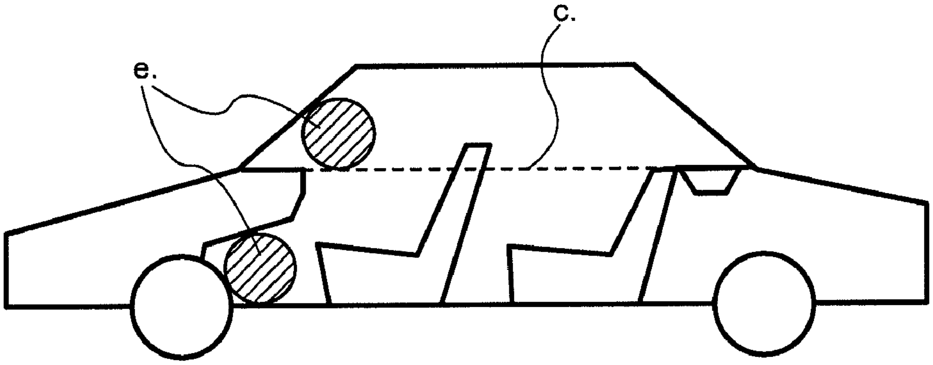
FIG. 9B shows node c and antinode e in the third-order resonance mode of the passenger interior.
Figure 9C:
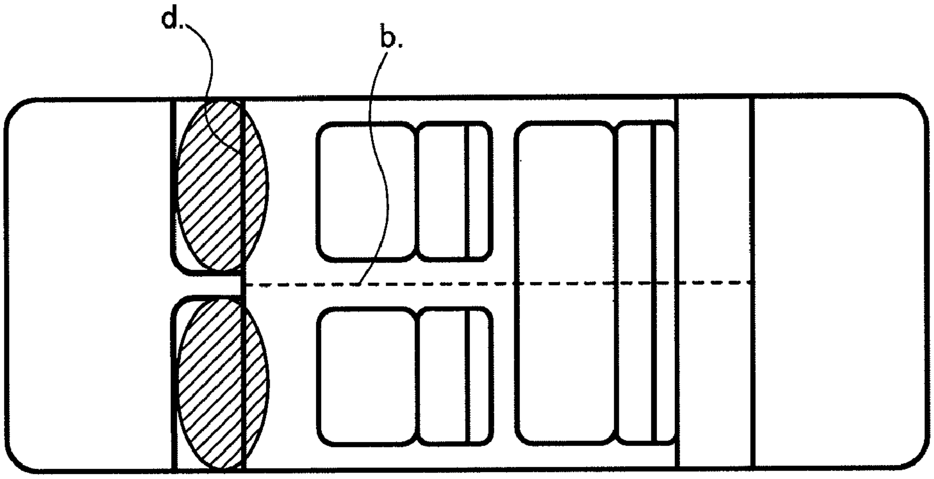
FIG. 9C shows node band antinode din the second-order resonance mode of the passenger interior.
Figure 10:
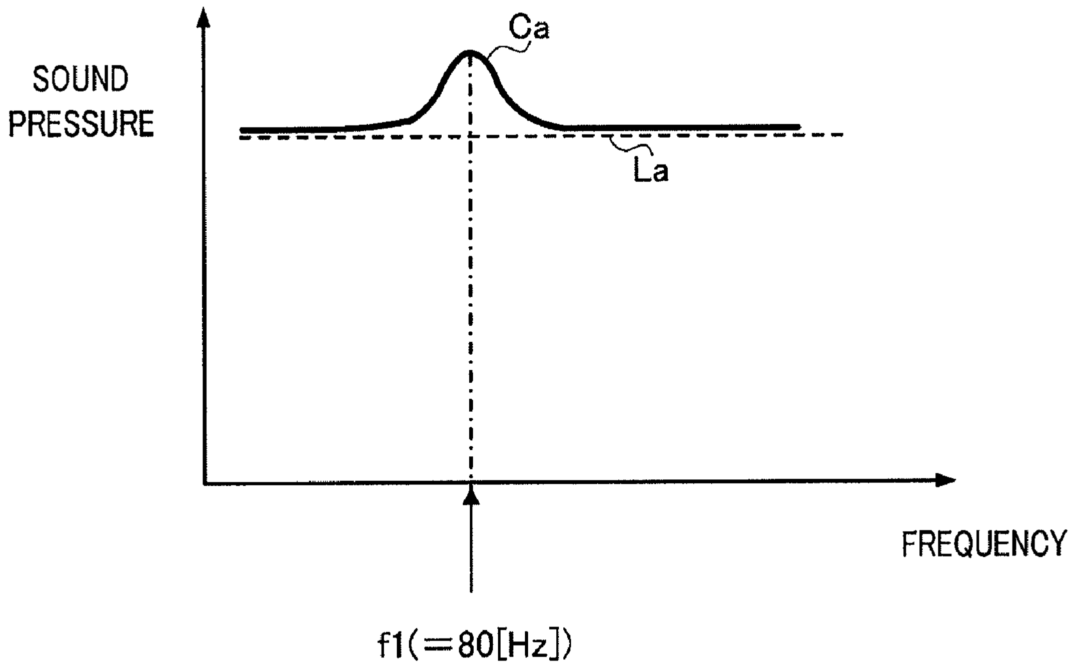
FIG. 10 is the first diagram showing sound pressure-frequency characteristics in case where there is a subwoofer only in the rear shelf.
Figure 11:
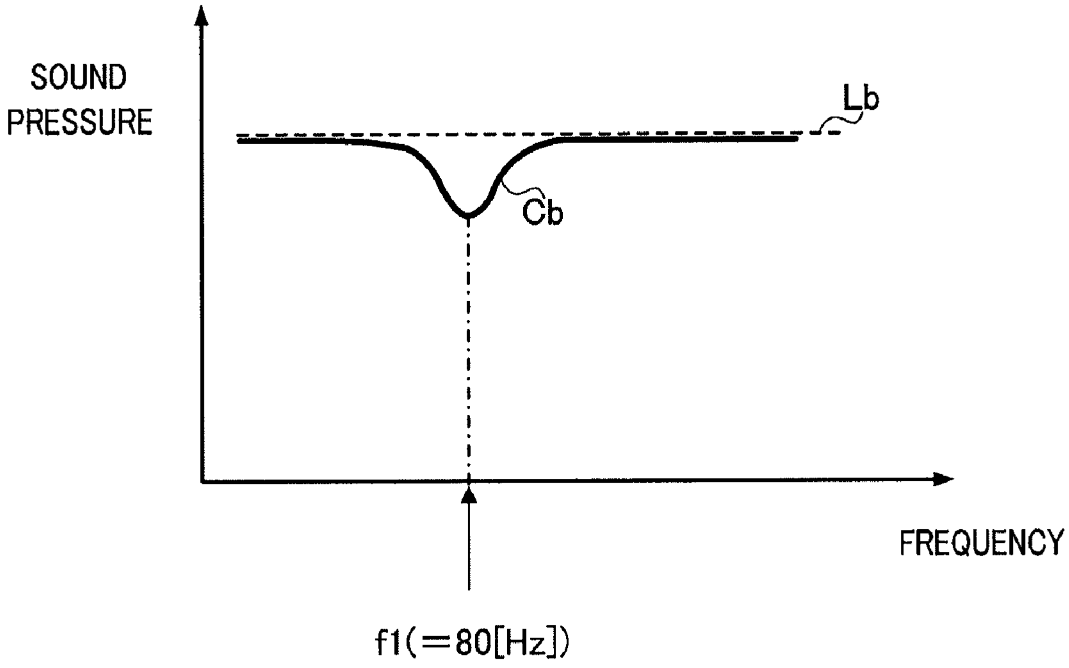
FIG. 11 is the second diagram showing sound pressure-frequency characteristics in case where there is a subwoofer only in the rear shelf.

With Embodiment 2, as shown by the pass characteristic curve C21 of FIG. 7, the first filter 221 passes components from the audio signals outputted from the playback apparatus 107, the components being included in a band lower than the first-order resonance frequency f1. The first subwoofer 211 outputs sounds based on the output signals of the first filter 221. Further, as shown by the pass characteristic curve C22 of FIG. 7, the second filter 222 passes components from the audio signals outputted from the playback apparatus 107, the components being in a band which includes the first-order resonance frequency f1 and which does not include the second-order resonance frequency f2. The second subwoofer 212 outputs sounds based on the output signal of the second filter 222.

What is different from Embodiment 1 is the higher side of the cutoff characteristics of the second filter 222, in which a band not including the second-order resonance frequency f2 is cut off.

Although sounds with a frequency band higher than the cutoff frequency of the higher side of the second filter 222 may be reproduced by the door speakers mounted in the doors in the first row, in this case, bass sounds is insufficient in the third row because the third row is far from the first row. Further, because installation locations cannot be secured, speakers of a 16 to 18-cm caliber that reproduce the frequency band of the second-order resonance frequency or higher cannot be mounted.

With Embodiment 2, the audio playback system has the third filter 223 that, as shown by the pass characteristic curve C23 of FIG. 7, passes the components of the audio signals from the playback apparatus 107, the components being included in the band including the second-order resonance frequency f2. The output signal of such third filter 223 is inputted to the third subwoofer 213 installed around the node 252 of the second-order resonance mode. By this means, it is possible to reproduce bass sounds with frequencies of around 80 Hz without exciting the second-order resonance mode M2 and solve the excess or shortage of bass sounds due to the seat location. Furthermore, given that other speakers such as door speakers only need to reproduce the frequency band of the second-order resonance frequency f2 or higher (see curve C24 of FIG. 7), a speaker of a 10-cm caliber or less needs to be mounted near each seat.

Given that the third subwoofer 213 is a little far from the seats in the third row, the fourth subwoofer 214 is installed near another node 253 of the second-order resonance mode M2, and sounds based on the output signal of the fourth filter 224 is reproduced. The fourth filter 224 only needs to have characteristics that a band including second-order resonance frequency f2 is allowed to pass. By this means, fluctuation in reproduced sound pressure of the low band between the seats is cancelled and bass sounds can be heard evenly in all seat.

Although the first to fourth subwoofers 211 to 214 are installed in the floor of the passenger interior 201 in FIG. 5A and FIG. 5B, the second subwoofer 212 may be installed anywhere near the node 251 of the first-order resonance mode M1 (for example, near the doors). Further, the third subwoofer 213 and the fourth subwoofer 214 may be installed anywhere near the nodes 251 and 252 in the second-order resonance mode (for example, near the doors).

As is clear from the above description and FIG. 7, the first subwoofer 211 outputs sounds based on the output signals of the first filter 221, that is, based on signals of the low band not including the first-order resonance frequency f1 which excites the first-order resonance mode M1. The second subwoofer 212 installed around the node 251 of the first-order resonance mode M1 outputs sounds based on the output signals of the second filter 222, that is, based on signal components in the passband in which the first-order resonance frequency f1 is placed in the center. The third and fourth subwoofers 213 and 214 output sounds based on output signals of the third and fourth filters 223 and 224 which pass a band including the second-order resonance frequency f2 of the passenger interior, that is, based on signal components in the passband in which the second-order resonance frequency f2 is placed in the center. Further, the door speakers (not shown) reproduce sounds with frequency bands higher than the second-order resonance frequency f2. By this means, sound pressure-frequency characteristics in the passenger interior becomes substantially flat in every seat, so that it is possible to reduce fluctuation in sound pressure-frequency characteristics of the low band between the seats of the passenger interior.

As described above, according to the audio playback system of the wagon vehicle 200, the first subwoofer 211 reproduces signal components which is included in a frequency band of the first-order resonance frequency f1 or lower. The second subwoofer 212 reproduces signal components which is included a frequency band whose center frequency is the first-order resonance frequency f1 (about 40 Hz). The third subwoofer and the fourth subwoofer reproduce signal components of a frequency band whose center frequency is the second-order resonance frequency f1 (about 80 Hz). Whereby, it is possible to reduce fluctuation in the sound pressure-frequency characteristics of the low band between the seats in the passenger interior and enjoy comfortable bass sounds in all seats of the wagon vehicle 200, that is, in the front seats 202, the middle seats 203 and the back seats 204.

The above description is an illustration of a preferred embodiment of the present invention and the present invention is not limited to this.

Further, although an example has been described where the present embodiment is applied to an audio playback system mounted in sedan and wagon vehicles, a similar system mounted in other vehicles may be possible.

Further, although the term "audio playback system" is used with the present embodiment for ease of description, other terms are certainly possible, including, for example, "audio system," "speaker apparatus mounted in the vehicle" and "electronic devices mounted in the vehicle."

Furthermore, each circuit section forming the above audio playback system, for example, the type, number and connecting method of filter sections are not limited to the above described embodiment.

The disclosure of Japanese Patent Application No. 2006-152447, filed on May 31, 2006, including the specification, drawings and abstract, is incorporated herein by reference in its entirety.

Industrial Applicability

The audio playback system according to the present invention is useful for the audio playback system installed in the passenger interior of a vehicle and is applicable for use in, for example, a product having a plurality of speakers for reproducing bass sounds. Further, the present invention is preferable in an audio playback system installed in a narrow space other than a vehicle.

The invention claimed is:

1. An audio playback system comprising:

a first filter, to which an audio signal outputted from a playback apparatus is inputted, configured to pass a frequency band lower than a first-order resonance frequency of an interior of a vehicle;

a first subwoofer configured to receive an output signal of the first filter;

a second filter, to which the audio signal from the playback apparatus is inputted, configured to pass a frequency band including the first-order resonance frequency of the interior; and a second subwoofer, to which an output signal of the second filter is inputted, configured to be installed near a node of a first-order resonance mode of the interior.

2. The audio playback system according to claim 1, wherein:

the first subwoofer is installed in a rear shelf in the interior; and the first filter is a low pass filter with a cutoff frequency equal to or lower than the first-order resonance frequency of the interior.

3. The audio playback system according to claim 1, wherein the second filter is a bandpass filter with a passband including the first-order resonance frequency of the interior.

4. The audio playback system according to claim 1, wherein the second filter is an octave bandpass filter with a passband including the first-order resonance frequency of the interior.

5. The audio playback system according claim 1, wherein the second filter is an octave bandpass filter in which a center frequency is the first-order resonance frequency of the interior.

6. The audio playback system according to claim 1, further comprising:

a third filter, to which the output signal of the playback apparatus is inputted, configured to pass a band of a second-order resonance frequency of the interior; and a third subwoofer, to which an output signal of the third filter is inputted, configured to be installed near a node of the second-order resonance mode of the interior.

7. The audio playback system according to claim 6, wherein the third filter is a bandpass filter with a passband including the second-order resonance frequency of the interior.

8. The audio reproduction apparatus according to claim 6, wherein the third filter is an octave bandpass filter, and a center frequency thereof is the second-order resonance frequency of the interior.

9. The audio playback system according to claim 6, further comprising:

a fourth filter, to which the output signal of the playback apparatus is inputted, configured to pass the frequency band including the second-order resonance frequency of the interior; and a fourth subwoofer configured to be installed near another node different from the node, on which the third subwoofer is installed, of the second-order resonance mode.

10. The audio playback system according to claim 9, wherein the fourth filter is a bandpass filter with passband including the second-order resonance frequency of the interior.

11. The audio playback system according to claim 9, wherein the fourth filter is an octave bandpass filter, and a center of a passband thereof is the second-order resonance frequency of the interior.

* * * * *